Patented Sept. 7, 1943

2,329,033

UNITED STATES PATENT OFFICE

2,329,033
STYRENE COPOLYMER PLASTIC COMPOSITION

Edgar C. Britton, Gerald H. Coleman, and John W. Zemba, Midland, Mich., assignors to The Dow Chemical Company, Midland, Mich., a corporation of Michigan No Drawing. Application June 5, 1939, Serial No. 277,442

10 Claims. (Cl. 260—36)

This invention concerns new synthetic resin plastic compositions, and in particular relates to plastic compositions comprising a resin derived from styrene and, as a plasticizing agent therefor, an aromatic di-ether of a glycol.

It is known that solid resinous products may be obtained by polymerizing monomeric styrene together with a variety of other unsaturated organic compounds containing olefinic linkages. For example, Staudinger (U. S. Patent No. 2,089,444) discloses resinous polymers prepared by the conjoint polymerization of styrene and divinyl benzene. Voss et al. (U. S. Patent No. 2,047,398) describes similar polymers prepared from styrene and maleic acid derivatives, and in the co-pending applications of Britton et al., Serial No. 191,958, filed February 23, 1938; Serial No. 191,959, filed February 23, 1938, now U. S. Patent 2,186,359; Serial No. 191,960, filed February 23, 1938, now U. S. Patent 2,186,360, Serial No. 199,892, filed April 4, 1938; Serial No. 213,022, filed June 10, 1938; and Serial No. 217,224, filed July 2, 1938 are described products prepared by polymerizing styrene in the presence of certain unsaturated esters and ethers, e. g. the di-cinnamate of 1.4-dioxanediol-2.3, trimethallyl phosphate, allyl crotonate, 2-chloro-allyl furoate, triallyl phosphate, allyl cinnamate, diallyl phthalate, the di-crotonate of 1.4-dioxanediol-2.3, di-(2-chloroallyl) oxalate, the diallyl ether of 1.4-dioxanediol-2.3, allyl methacrylate, etc.

The above-described products are usually obtained as glass-like thermoplastic resins, although in some cases they may be obtained as opaque, white, friable materials, which, however, may be molded to form glass-like products. The polymers initially obtained as clear transparent resins may be soluble in the usual solvents for polystyrene, e. g. carbon tetrachloride, dioxane, methylene chloride, benzene, toluene, ethylbenzene, etc., or they may be capable only of swelling to form insoluble gels when contacted with such solvents. The opaque, white, friable polymers are insoluble and non-swelling in polystyrene solvents. All such solid resinous products are herein referred to as "co-polymers," although their exact chemical constitution is not definitely known. Similarly, the unsaturated compounds which may be employed in preparing such products are referred to as "co-polymerizing agents" and the polymerization of mixtures of styrene and such agents is referred to as "co-polymerization." All of the co-polymers of styrene possess properties which render them valuable in the manufacture of molded or shaped objects. For example, they are stable to discoloration, have good dielectric strength, high mechanical strength and impermeability to moisture, and are resistant to attack by acids, alkalies, etc.

In preparing such molded or shaped products, however, difficulty is encountered in securing adequate flow during molding without resorting to the use of molding temperatures considerably higher than those usually employed in molding thermoplastic materials. Many of the compounds which are employed as plasticizing agents to increase the plasticity and flow during molding of pure polystyrene are unsatisfactory as plasticizing agents for the co-polymers of styrene, since they impart the desired properties to the co-polymers only when used in such large proportions that the mechanical strength of the composition is greatly reduced. Certain of such plasticizing agents are further disadvantageous in that they tend to vaporize and exude to the surface of the plasticized composition with resultant loss in plasticizing action and, frequently, blushing of the finished product.

We have now found that the aromatic di-ethers of the glycols may be advantageously employed as plasticizing agents for the co-polymers of styrene. Compositions comprising styrene co-polymers plasticized with relatively small amounts of the new agents possess adequate plasticity and flow at molding temperatures, and at the same time they retain to a large extent the strength characteristics of the unplasticized co-polymers. In many cases, the plasticized co-polymers even show improved strength characteristics because of the improved molding secured through the use of the new plasticizing agents. Moreover, the plasticized compositions are clear and transparent and show less tendency to blush or craze upon aging than do the unplasticized co-polymers.

The aromatic di-ethers which we have found to be most suitable as plasticizing agents for the co-polymers of styrene according to the invention may be represented by the general formula

$$R-O-C_nH_{2n}-O-R$$

wherein each R represents a xenyl, phenyl, halophenyl, alkyl-phenyl, cycloalkyl-phenyl, or alkoxy-phenyl group and $n$ represents an integer greater than 1. Examples of such compounds are 1.2 - diphenoxy - ethane, 1.3-di-(4-xenoxy)-propane, 1.3-di(3-methyl phenoxy)-isobutane, 1.3-di(2.4.6-trichlorophenoxy)-propane, 1-phenoxy-2-(2-xenoxy)-isobutane, 1.4-di(2-ethoxy-phenoxy)-butane, 1.5-di(2.4-dimethylphenoxy)-pentane, 1-(4-tertiarybutylphenoxy)-3-(5-chloro-2-xenoxy)-butane, 1.2 - di(4-bromophenoxy)-ethane, 1.2 - di(4 - tertiaryoctylphenoxy) - propane, 1.8-di(o-methylphenoxy)-octane, 1.2-di(4-cyclohexylphenoxy)-ethane, 1.6-di(2 - chloro - 4 - tertiarybutylphenoxy)-hexane, 1-(tertiarybutyl-2-xenoxy)-2-(2.4.6-trichlorophenoxy)-ethane, 1.3-di(2.4 - ditertiarybutylphenoxy) - butane, etc. These compounds vary in physical characteristics from high-boiling viscous liquids to crystalline solids. They are soluble in a wide variety of solvents and solvent mixtures, are stable to light and heat, and are compatible with co-polymeric styrene.

The new plastic compositions comprising styrene co-polymers and our new plasticizing agents are conveniently prepared by polymerizing a mixture of monomeric styrene, a co-polymerizing agent, and the plasticizing agent. The latter may be employed in any proportion within the limits of its compatibility with the co-polymer but is usually employed in an amount representing from 1 to 50 per cent by weight of the entire composition, the most effective amount depending somewhat upon the use to which the composition is to be put. For example, compositions which are to be employed in the manufacture of hard molded objects preferably contain from about 1 to about 15 per cent by weight of the plasticizing agent, whereas soft, rubber-like compositions contain a somewhat greater, e. g. 30 to 50 per cent, proportion of the plasticizing agent. The co-polymerizing agents are usually employed in amounts representing 0.1 to 15 per cent by weight of the styrene, although the optimum amount depends upon the particular co-polymerizing agent employed and upon the properties desired in the composition. The polymerization is usually carried out by heating the mixture of monomeric styrene, co-polymerizing agent, and plasticizing agent at a moderately elevated temperature, e. g. 60°–180° C. for 3–14 days, during which time the mixture gradually polymerizes to form a resinous polymer having the plasticizing agent homogeneously dispersed therethrough. A large amount of heat is developed during the polymerization, and when operating on a large scale it is advantageous to provide heat dissipating means in order to maintain the desired temperature. If desired, the polymerization may be initiated at a relatively low temperature, e. g. 60° C., and the temperature gradually increased as the polymerization proceeds.

Compositions comprising styrene co-polymers of the type capable of being swelled rather than dissolved by solvents may be prepared by forming the co-polymer in the absence of the plasticizing agent, i. e. by polymerizing a mixture of monomeric styrene and a co-polymerizing agent, and thereafter causing the co-polymer to swell to a gel in a solution of the plasticizing agent in a swelling solvent, e. g. benzene, toluene, carbon tetrachloride, etc. During the swelling operation, the plasticizing agent is absorbed by the co-polymer gel, and, after the removal of solvent, the co-polymer is recovered in the form of a granular or fibrous mass having the plasticizing agent in uniform and intimate dispersion therethrough. This method of incorporating a plasticizing agent with a styrene co-polymer forms the subject-matter of the co-pending application of Britton and Marshall, Serial No. 209,736, filed May 24, 1938.

A third method which may be employed in preparing the new compositions comprises mechanically mixing the finely divided co-polymer with a plasticizing agent, with or without the aid of solvents, in a Banbury-type mixer or on heated compounding rolls until a homogeneous composition is obtained.

The following examples illustrate a number of ways in which the principle of the invention has been applied but are not to be construed as limiting the same:

EXAMPLE 1

Compositions comprising the co-polymer of styrene and the di-cinnamate of 1.4-dioxanediol-2.3 plasticized with various aromatic di-ethers were prepared by polymerizing mixtures containing 500 parts by weight of monomeric styrene, 2.5 parts of the di-cinnamate of 1.4-dioxanediol-2.3, and from 5 to 125 parts of the plasticizing agent. The polymerization was carried out by heating the mixture at 100° C. for from 7 to 14 days. The compositions so prepared were in most instances clear transparent resins which were insoluble in alcohol and capable of being swelled to insoluble gels by benzene and similar aromatic hydrocarbon solvents. These products were ground, dried, and molded into test specimens, employing a molding temperature of 160° C. The test specimens were then tested for mechanical strength, hardness, heat distortion, and softening point. The data obtained, together with comparative data on the unplasticized co-polymer, are presented in Table I below:

Table I

| Run No. | Plasticizing agent Name | Per cent | Tensile strength Lbs./sq. in. | Hardness (Shore) | Impact strength In. lbs. | Heat distortion °C. | Softening point °C. |
|---|---|---|---|---|---|---|---|
| 1 | | | [1] 6,800 | [1] 85 | [1] 1.1 | [1] 82 | [1] 121 |
| 2 | 1.2-diphenoxy-ethane | 9.0 | 5,800 | 78 | 1.0 | 54 | |
| 3 | 1.2-di(4-tertiarybutyl-phenoxy)-ethane | 9.0 | 5,000 | 74 | 1.1 | 62 | |
| 4 | do | 23.0 | 5,000 | 75 | 0.8 | 41 | |
| 5 | 1.2-di(4-chloro-phenoxy)-ethane | 2.0 | 6,500 | 82 | 1.4 | 80 | 116 |
| 6 | do | 9.0 | 7,500 | 77 | 1.3 | 67 | 110 |
| 7 | 1.2-di(2.4-dichloro-phenoxy)-ethane | 5.5 | 7,500 | 83 | 1.3 | 79 | 97 |
| 8 | 1.2-di(2.4.6-trichloro-phenoxy)-ethane | 2.0 | 5,700 | 85 | 1.4 | 77 | 124 |
| 9 | 1.2-di(2-chloro-4-tertiarybutyl-phenoxy)-ethane | 9.0 | 7,100 | 81 | 1.3 | 69 | 102 |
| 10 | 1.2-di(2-methoxy-phenoxy)-ethane | 2.0 | 8,800 | [2] 15x-93 | 1.3 | 81 | 121 |
| 11 | do | 5.0 | 8,400 | [2] 15x-91 | 1.0 | 76 | 115 |
| 12 | do | 10.0 | 5,000 | [2] 15x-90 | 0.8 | 67 | 114 |
| 13 | 1.3-diphenoxy-isobutane | 4.5 | 6,600 | 76 | 1.4 | 62 | |
| 14 | do | 9.0 | 4,800 | 78 | 1.3 | 52 | |
| 15 | 1.3-di(4-chloro-phenoxy)-isobutane | 2.0 | 8,900 | 84 | 1.2 | 76 | 107 |
| 16 | 1.3-di(4-tertiarybutyl-phenoxy)-isobutane | 1.0 | 6,400 | 85 | 1.1 | 82 | 117 |
| 17 | do | 5.0 | 7,400 | 75 | 1.1 | 74 | 123 |
| 18 | do | 10.0 | 6,600 | 83 | 1.0 | 84 | 122 |
| 19 | 1.2-di(2-xenoxy)-ethane | 9.0 | 7,700 | 82 | 1.2 | 70 | 104 |
| 20 | do | 23.0 | 4,300 | 76 | 1.1 | 48 | 106 |
| 21 | 1.2-di(4-xenoxy)-ethane | 1.0 | 5,100 | 80 | 1.3 | 86 | 128 |
| 22 | do | 2.5 | 4,900 | 77 | 1.2 | 86 | 130 |
| 23 | do | 10.0 | 3,200 | 76 | 0.8 | 89 | 135 |
| 24 | 1.3-di(2-xenoxy)-isobutane | 2.5 | 7,900 | 83 | 0.9 | 83 | 110 |
| 25 | do | 5.0 | 7,600 | 86 | 1.1 | 80 | 112 |
| 26 | do | 10.0 | 6,800 | 76 | 0.6 | 69 | 113 |

[1] Average value.
[2] Rockwell hardness.

EXAMPLE 2

The following Table II presents data illustrating the effect of several of our new plasticizing agents on the physical properties of the co-polymer of styrene and trimethallyl phosphate. In each case a mixture containing 500 parts by weight of monomeric styrene, 20 parts of trimethallyl phosphate, and from 10 to 50 parts of the plasticizing agent was polymerized by heating at 100° C. for 14 days, after which time the polymerized mass was ground, dried, and molded at 160° C. to form test specimens, and the properties of the latter were determined as in Example 1.

Table II

| Run No. | Plasticizing agent Name | Per cent | Tensile strength Lbs./sq. in. | Hardness (Shore) | Impact strength In. lbs. | Heat distortion °C. | Softening point °C. |
|---|---|---|---|---|---|---|---|
| 1 | 1.2-di(4-chloro-phenoxy)-ethane | 2.0 | 5,200 | 79 | 1.1 | 67 | 108 |
| 2 | 1.2-di(4-chloro-phenoxy)-ethane | 2.0 | 7,400 | 77 | 1.4 | 68 | 118 |
| 3 | ...do | 9.0 | 6,500 | 73 | 0.9 | 60 | 104 |
| 4 | 1.2-di(2.4.6-trichloro-phenoxy)-ethane | 2.0 | 6,300 | 76 | 1.3 | 72 | 108 |
| 5 | ...do | 9.0 | 5,900 | 81 | 1.2 | 62 | 99 |
| 6 | 1.2-di(2-chloro-4-tertiarybutyl-phenoxy)-ethane | 2.0 | 5,200 | 80 | 0.8 | 63 | 117 |
| 7 | ...do | 9.0 | 5,100 | 77 | 0.8 | 63 | 116 |
| 8 | 1.2-di(2-xenoxy)-ethane | 9.0 | 6,300 | 78 | 1.2 | 55 | |
| 9 | 1.3-di(2-xenoxy)-isobutane | 2.0 | 6,000 | 84 | 0.9 | 70 | 117 |

EXAMPLE 3

A composition comprising the co-polymer of styrene and allyl cinnamate plasticized with 1.3-di(4-tertiarybutylphenoxy)-isobutane was prepared by polymerizing a mixture containing 500 parts by weight of monomeric styrene, 25 parts of allyl cinnamate, and 12.5 parts of 1.3-di(4-tertiarybutylphenoxy)-isobutane. This composition, together with the unplasticized co-polymer and a similar composition containing 10 per cent of the plasticizing agent was injection-molded on a commercial injection-molding machine. The behavior of the three compositions during molding as well as the strength properties of the molded products are tabulated in Table III.

Table III

| Per cent plasticizing agent | 0.0 | 2.5 | 10.0 |
|---|---|---|---|
| Molding temperature °C | 245-250 | 220-225 | 185-195 |
| Molding pressure tons | 11 | 8 | 8 |
| Time for 1.0" flow at 135° C secs | 138 | 88 | 42 |
| Time for 1.35" flow at 135° C do | 242 | 122 | 47 |
| Bubbles in molded product | Many | Few | None |
| Impact strength of molded product in. lbs | 0.96 | 0.84 | 0.83 |
| Tensile strength of molded product in. lbs | 8,500 | 9,500 | 8,500 |

EXAMPLE 4

A mixture of 500 parts by weight of monomeric styrene, 10 parts of diallyl maleate, 25 parts of 1.3-diphenoxy-isobutane, and 2.5 parts of the opaque, white co-polymer obtained by polymerizing a mixture of styrene and diallyl maleate at 80° C. was polymerized by heating at 80° C. for 336 hours. The product obtained consisted of about equal parts of the glass-like, swelling type and the opaque, white, non-swelling type of co-polymer. The latter material was separated, washed with acetone, ground and dried, and molded into a test specimen. It had a tensile strength of about 6400 lbs./sq. in., and a Shore hardness of about 80.

EXAMPLE 5

A mixture of 200 parts by weight of monomeric styrene and 1.0 part of the di-cinnamate of 1.4-dioxanediol-2.3 was polymerized by heating at 100° C. for 5 days. The resinous polymer obtained was insoluble in ethanol and acetone but was capable of being swelled to an insoluble gel in benzene and similar aromatic hydrocarbon solvents. Approximately 20 parts of this co-polymer were added in finely divided form to 250 parts of a 4 per cent benzene solution of 1.2-di(2-xenoxy)-ethane. The mixture was allowed to stand for several hours whereby the co-polymer swelled to a firm gel, after which time the benzene was evaporated off and the mixture was dried under vacuum. The co-polymer was obtained as a resinous mass having the plasticizing agent uniformly incorporated therein.

The invention is capable of many modifications and is not limited by the examples given above. For example, polymerization of a mixture of styrene, a co-polymerizing agent, and one or more of the new plasticizing agents may be carried out in the presence of solvents, emulsions, polymerization catalysts, such as benzoyl peroxide or strong mineral acids, etc., to obtain a variety of useful products. If desired, various dyes, pigments, non-thermoplastic fillers, resins, etc. may be incorporated with the new products to produce decorative effects or to modify the physical properties of the molded products.

Other modes of applying the principle of our invention may be employed instead of those explained, change being made as regards the method herein disclosed or the materials employed, provided the method stated by any of the following claims be employed, or the product claimed in any of the following claims be obtained.

We therefore particularly point out and distinctly claim as our invention:

1. A composition of matter comprising a benzene swellable co-polymer of styrene and an unsaturated ester and, as a plasticizing agent therefor, an aromatic di-ether having the general formula

$$R-O-C_nH_{2n}-O-R'$$

wherein R and R' each represents a radical selected from the group consisting of the xenyl, phenyl, halo-phenyl, alkyl-phenyl, cycloalkyl-phenyl, and alkoxy-phenyl radicals, and $n$ represents an integer greater than 1.

2. A composition of matter comprising a benzene swellable co-polymer of styrene and an unsaturated ester and, as a plasticizing agent therefor, an aromatic di-ether having the general formula $$R\!-\!O\!-\!C_nH_{2n}\!-\!O\!-\!R$$

wherein each R represents the same radical selected from the group consisting of the xenyl, phenyl, halo-phenyl, alkyl-phenyl, cycloalkyl-phenyl, and alkoxy-phenyl radicals, and $n$ represents an integer greater than 1.

3. A composition of matter comprising a benzene swellable co-polymer of styrene and an unsaturated ester and, as a plasticizing agent therefor, an aromatic di-ether having the general formula $$R\!-\!O\!-\!CH_2\cdot CH_2\!-\!O\!-\!R'$$

wherein R and R' each represents a radical selected from the group consisting of the xenyl, phenyl, halo-phenyl, alkyl-phenyl, cycloalkyl-phenyl, and alkoxy-phenyl radicals.

4. A composition of matter comprising a benzene swellable co-polymer of styrene and an unsaturated ester and, as a plasticizing agent therefor, an aromatic di-ether having the general formula $$R\!-\!O\!-\!\underset{\underset{CH_3}{|}}{CH}\!-\!CH_2\!-\!O\!-\!R'$$

wherein R and R' each represents a radical selected from the group consisting of the xenyl, phenyl, halo-phenyl, alkyl-phenyl, cycloalkyl-phenyl, and alkoxy-phenyl radicals.

5. A composition of matter comprising a benzene swellable co-polymer of styrene and an unsaturated ester and, as a plasticizing agent therefor, an aromatic di-ether having the general formula $$R\!-\!O\!-\!CH_2\!-\!\underset{\underset{CH_3}{|}}{CH}\!-\!CH_2\!-\!O\!-\!R'$$

wherein R and R' each represents a radical selected from the group consisting of the xenyl, phenyl, halo-phenyl, alkyl-phenyl, cycloalkyl-phenyl, and alkoxy-phenyl radicals.

6. A composition of matter comprising a benzene swellable co-polymer of styrene and an unsaturated ester, and, as a plasticizing agent therefor, 1.3 - di(4 - tertiarybutylphenoxy)-isobutane.

7. A composition of matter comprising a benzene swellable co-polymer of styrene and an unsaturated ester and, as a plasticizing agent therefor, 1.2 - di(2 - chloro - 4 - tertiarybutylphenoxy)-ethane.

8. A composition of matter comprising a benzene swellable co-polymer of styrene and the dicinnamate of 1.4-dioxanediol-2.3 and, as a plasticizing agent therefor, an aromatic di-ether having the general formula $$R\!-\!O\!-\!C_nH_{2n}\!-\!O\!-\!R'$$

wherein R and R' each represents a radical selected from the group consisting of the xenyl, phenyl, halo-phenyl, alkyl-phenyl, cycloalkyl-phenyl, and alkoxy-phenyl radicals, and $n$ represents an integer greater than 1.

9. A composition of matter comprising a benzene swellable co-polymer of styrene and diallyl maleate and, as a plasticizing agent therefor, an aromatic di-ether having the general formula $$R\!-\!O\!-\!C_nH_{2n}\!-\!O\!-\!R'$$

wherein R and R' each represents a radical selected from the group consisting of the xenyl, phenyl, halo-phenyl, alkyl-phenyl, cycloalkyl-phenyl, and alkoxy-phenyl radicals, and $n$ represents an integer greater than 1.

10. A composition of matter comprising a benzene swellable co-polymer of styrene and trimethallyl phosphate and, as a plasticizing agent therefor, an aromatic di-ether having the general formula $$R\!-\!O\!-\!C_nH_{2n}\!-\!O\!-\!R'$$

wherein R and R' each represents a radical selected from the group consisting of the xenyl, phenyl, halo-phenyl, alkyl-phenyl, cycloalkyl-phenyl, and alkoxy-phenyl radicals and $n$ represents an integer greater than 1.

EDGAR C. BRITTON.
GERALD H. COLEMAN.
JOHN W. ZEMBA.